US009338640B2

(12) United States Patent
Saino

(10) Patent No.: US 9,338,640 B2
(45) Date of Patent: May 10, 2016

(54) SYSTEM AND METHOD FOR REMOTELY TRIGGERING ACTIONS ON A MOBILE DEVICE

(75) Inventor: Lorenzo Saino, Mortara (IT)

(73) Assignee: FRANCE TELECOM, Paris (FR)

( * ) Notice: Subject to any disclaimer, the term of this patent is extended or adjusted under 35 U.S.C. 154(b) by 0 days.

(21) Appl. No.: 13/997,018

(22) PCT Filed: Dec. 20, 2011

(86) PCT No.: PCT/EP2011/073431
§ 371 (c)(1),
(2), (4) Date: Jun. 21, 2013

(87) PCT Pub. No.: WO2012/084965
PCT Pub. Date: Jun. 28, 2012

(65) Prior Publication Data
US 2013/0260739 A1   Oct. 3, 2013

(30) Foreign Application Priority Data
Dec. 22, 2010   (EP) .................................... 10306484

(51) Int. Cl.
*H04W 8/22*   (2009.01)
*G06F 9/54*   (2006.01)
(Continued)

(52) U.S. Cl.
CPC ................. *H04W 8/22* (2013.01); *G06F 9/547* (2013.01); *H04L 67/10* (2013.01); *H04W 4/003* (2013.01); *H04L 67/2814* (2013.01); *H04L 67/40* (2013.01)

(58) Field of Classification Search
CPC ....... H04W 8/205; H04W 8/245; H04W 4/12; H04W 4/14; H04W 88/184; H04W 8/22; H04L 63/0853; H04L 63/0428; H04L 67/26
See application file for complete search history.

(56) References Cited

U.S. PATENT DOCUMENTS 8,738,898 B2 * 5/2014 Herwono et al. ............. 713/155
2005/0021940 A1 * 1/2005 Ma ................................. 713/155
(Continued)

FOREIGN PATENT DOCUMENTS

EP          1933249 A1    6/2008
WO    2010127149 A1    11/2010

OTHER PUBLICATIONS

International Search Report and Written Opinion dated Mar. 1, 2012 for corresponding International Application No. PCT/EP2011/073431, filed Dec. 20, 2011.
(Continued)

*Primary Examiner* — Liton Miah
(74) *Attorney, Agent, or Firm* — David D. Brush; Westman Champlin & Koehler, P.A.

(57) ABSTRACT

A method for selecting data from a first electronic device for a second electronic device. The second electronic device includes an authentication module and is arranged to receive messages over a communication bearer, and transfer a received message to the authentication module when determining from an indication in the received message that the message is intended for the authentication module. The method includes receiving from the first electronic device the selected data, retrieving one or more commands associated to the selected data, generating using the selected data and associated command(s) a triggering message, the triggering message including an indication that the triggering message is intended for the authentication module of the second electronic device for triggering the command(s) for the selected data, and sending the triggering message over the communication bearer to the second electronic device, thereby causing the authentication module to trigger the command for the selected data.

8 Claims, 7 Drawing Sheets

(51) Int. Cl.
  *H04W 4/00* (2009.01)
  *H04L 29/08* (2006.01)
  *H04L 29/06* (2006.01)

(56) References Cited

U.S. PATENT DOCUMENTS

| | | | |
|---|---|---|---|
| 2007/0207798 A1* | 9/2007 | Talozi et al. | 455/423 |
| 2007/0257982 A1 | 11/2007 | Luo et al. | |
| 2008/0051062 A1* | 2/2008 | Lee | 455/411 |
| 2008/0318550 A1* | 12/2008 | DeAtley | H04L 63/08 |
| | | | 455/411 |
| 2010/0279652 A1* | 11/2010 | Sharp et al. | 455/410 |
| 2010/0298011 A1 | 11/2010 | Pelley et al. | |
| 2012/0208597 A1* | 8/2012 | Billman | H04W 8/205 |
| | | | 455/558 |

OTHER PUBLICATIONS

Chen Y-F et al., "Montle EE—An Enterprise Mobile Service Platform" Wireless Networks; ACM, 2 Penn Plaza, Suite 701—New York, USA, vol, 9, No. 4, Jul. 1, 2003, pp. 283-297, XP001186984.

* cited by examiner

SYSTEM AND METHOD FOR REMOTELY TRIGGERING ACTIONS ON A MOBILE DEVICE

CROSS-REFERENCE TO RELATED APPLICATIONS

This Application is a Section 371 National Stage Application of International Application No. PCT/EP2011/073431 filed Dec. 20, 2011, which is incorporated by reference in its entirety and published as WO 2012/084965 on Jun. 28, 2012, in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE PRESENT SYSTEM

This system and method relate to communication services. More specifically, it relates to a system and a method for remotely triggering actions or transfer data on a mobile device.

BACKGROUND OF THE PRESENT SYSTEM

Nowadays, more and more people own or regularly use a plurality of heterogeneous computation or communication devices, such as mobile phones, Personal Computers (PC), laptops, tablets and Personal Digital Assistants (PDA). In addition, more and more people also own or regularly use a plurality of devices with similar features. For example, it is not unusual for an office worker to use two different personal computers (one at home and one in the office) or to have two different mobile phones (one for personal and one for professional use).

All the different devices used by a person do not generally have the same set of capabilities. In fact, as an example, only some of those devices may be capable of making/receiving phone calls. Furthermore, only some of those devices may be easily carried by the user, such as mobile phones or PDAs. Differently, other devices may be more difficult to transport around (such as laptops). Other may not be transported at all (such as personal computers). Moreover, there are certain types of tasks that, although they could be performed by most or all of the devices of a user, can be comfortably executed only with few of those. For instance, Internet browsing can be generally executed on a large range of devices. It is nonetheless far quicker and easier to do it on a PC with large screen and an ergonomic QWERTY keyboard, rather than on a touch-screen smartphone, with smaller screen and smaller keyboard.

Because of the different sets of capabilities of the various devices regularly used by a person, it could happen in many occasions that a user may need to perform tasks that require two or more devices to be completed. For instance, if a user is at home and wants to search for the phone number of a restaurant in order to make a reservation, it will search it on Internet preferably from its PC or laptop (which has large screen and ergonomic keyboard) and then dial it from its mobile phone. Another case of an action requiring the use of multiple devices consists in a user looking at the map of a place it is about to go and saving it on its mobile for later retrieval when arriving on site.

The execution of such tasks is frequently a cause of poor user experience, as it generally requires superfluous user intervention. For example, if a user wants to dial a phone number found while browsing the Internet from its laptop or PC, it would generally need to manually type the number in the mobile before being able to dial it. Another example is represented by the case of a user desiring to bookmark on a mobile phone a webpage found while browsing on the Web on another device. In this case, the user would have to type the entire Uniform Resource Locator (URL) of that web page on the target mobile device in order to bookmark it.

Another cause of poor user experience is caused by the difficulty of moving data across devices. For instance, if a user wants to copy an image or a music file from its PC to its mobile phone, it will have to connect the two device via a cable or to establish a local wireless network connection, such as a Bluetooth connection and then to transfer the required data.

All the issues described above could be considerably mitigated if the network connectivity of those devices could be advantageously used to make possible to exchange data and to remotely trigger actions or command from one device to another without the need of establishing a point-to-point communication link between the devices.

A number of solutions are known to those skilled in the art to address the issues described above. A downfall of these solutions is the need for a mobile application to be installed on the mobile phone in order to:

receive data originated by another device over a network communication channel,
elaborate the information received,
trigger actions as specified in the received message.

In fact, the need of having a specific mobile application installed on the target mobile device is a considerable limitation of all those solutions, for a number of different reasons. First of all, for large scale deployment, a service provider needs to implement a specific mobile client application for all the mobile operating systems that are intended to be targeted. For instance, if it is desired to target devices equipped with Android, iOS, Blackberry OS (operating system) and Symbian Platform, four different client applications must be implemented. As a result, this would increase the time and cost of development, testing and maintenance of the solution.

Secondly, another limitation is the impossibility of targeting low end devices. In fact, such devices usually do not support the installation of applications after being shipped by the manufacturer.

Thirdly, the need for a user to manually discover and install the mobile application may be a cause of discomfort that could result in a reduced adoption of the service, especially among users with little familiarity with the usage of mobile devices.

Fourthly, since the application is linked to the mobile device, a user is required to discover and install it every time he uses a new device. This is another cause of user discomfort. In fact, in addition to the discomfort generated by the manual execution of application discovery and installation, if the user's new device is equipped with a different operating system from his previous device, the procedure for discovering and installing the application may be different. Furthermore, the user may be required to further configure the application on the new device in order to work correctly. All this considerably affects user experience as the user is required to carry out repetitive tasks that could be avoided.

There is still a need today for a solution that allows the transfer of data and a command linked to the data from one device to another. There is a further need for a solution that can work for various types of phones, including smartphones, regardless of their OS and low end devices that cannot support the download of a dedicated application.

SUMMARY OF THE PRESENT SYSTEM AND METHOD

An aspect of the present system proposes a method of selecting data from a first electronic device for a second electronic device. The second electronic device includes an identity module card and is arranged to receive messages over a communication bearer, and transfer a received message to the identity module card when determining from an indication in said received message that the receive message is intended for said identity module card. The method includes acts of: retrieving data selected on the first electronic device; retrieving one or more commands associated to said selected data; generating using the selected data and associated command(s) a triggering message, said triggering massage comprising an indication that the triggering message is intended for the identity module card of the second electronic device and enabling a triggering of said command(s) for said selected data; and sending the triggering message over the communication bearer to the second electronic device, thereby causing the identity module card to trigger the command for the selected data.

Thanks to the present method, a method is provided to seamlessly transfer data and a command or action related to that data to the authentication or identity module card of the recipient electronic device. There is no need for an additional plug-in or local application for the recipient electronic device as most electronic device, even low end devices, are equipped today with an authentication module such as a SIM card. Such a solution can be deployed on a large scale without much adaptation of existing devices as required with the existing solutions. In other words, a cross platform or OS solution is proposed.

BRIEF DESCRIPTION OF THE DRAWINGS

The present system and method are explained in further details, and by way of example, with reference to the accompanying drawings wherein.

DESCRIPTION OF THE PRESENT SYSTEM

In the following description, for purposes of explanation rather than limitation, specific details are set forth such as architecture, interfaces, techniques, etc., for illustration. However, it will be apparent to those of ordinary skill in the art that other embodiments that depart from these details would still be understood to be within the scope of the appended claims.

Moreover, for the purpose of clarity, detailed descriptions of well-known devices, systems, and methods are omitted so as not to obscure the description of the present system. Furthermore, routers, servers, nodes, base stations, gateways or other entities in a telecommunication network are not detailed as their implementation is beyond the scope of the present system and method.

For purposes of simplifying a description of the present system, the terms "operatively coupled", "coupled", and formatives thereof as utilized herein refer to a connection between devices and/or portions thereof that enables operation in accordance with the present system. For example, an operative coupling may include one or more of a wired connection and/or a wireless connection between two or more electronic devices that enables a one and/or two-way communication path between the devices and/or portions thereof. In another example, an operative coupling may include a wired and/or wireless coupling to enable communication between a mediation server according to the present system and one or more electronic devices.

Unless specified otherwise, the exemplary embodiment here after will be described in its application to a mobile electronic device or mobile device in short operable to execute the command associated to the transferred data from a first electronic device like a desktop or laptop computer for instance. The description of the present system reported below is described with specific reference to the terminology and the functional entities defined in $3^{rd}$ Generation Partnership Project (3GPP) specifications. However, this is done purely for exemplificative purposes and it is not be intended to limit the scope of the invention, which is only determined by the appended claims. Those skilled in the art would recognize that the concepts described herein may be advantageously used in other non-3GPP-compliant mobile networks as well.

The present exemplary embodiment is in no way a limitation of the scope of the present method and system as the present teachings could be implemented for other electronic or telecommunication devices, such as PDAs (Personal Digital Assitants), pads (like the iPad™ from Apple), and the likes, provided they host an authentication or identity module card.

Some or all of the issues with the prior art and identified above could be addressed or at least mitigated by embodiments of the system hereby disclosed. In order to explain how this system may guarantee cross-platform interoperability among other results, this invention is described as follows.

Figure 1:
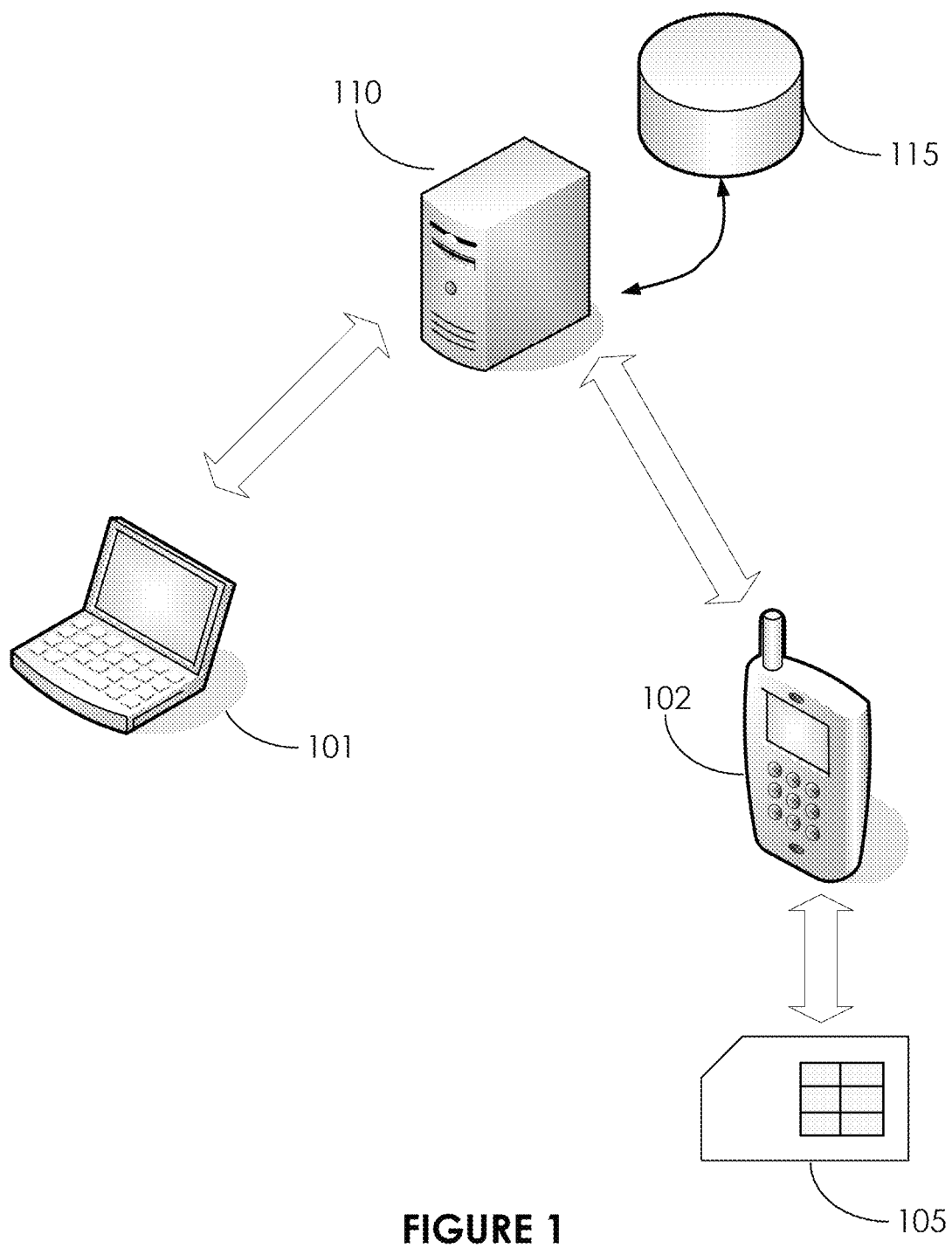
FIG. 1 shows an exemplary embodiment of the present system.

FIG. 1 is an illustration of an exemplary embodiment of the present system. As explained above, the main objective of the present system and method is to enable:

the triggering of actions or commands (such as phone call initiation, Unstructured Supplementary Service Data or USSD service initiation, open web links . . . ) on an authentication module bearing mobile device 102, or target device, from a first electronic device 101, also referred to as the source device. The action is associated to data (such as files, phone number, web address, and contact information) that is selected by a user on the first electronic device 101, the transfer of the selected data, along with the command from said first electronic device 101 to said authentication module bearing mobile device 102.

These features may be enabled thanks the use of:
a mediation server 110 receiving the data to be transferred and one or more associated commands from the first electronic device 101. The mediation server then generates from the received data and associated action a new or triggering message to be sent to the second electronic device 102 but with an indication that it is intended to its authentication module card 105. The triggering message enables the triggering of the action for the selected data, an identity or authentication module card 105, which is an integrated Circuit Card (ICC) hosting an applet capable of issuing proactive commands to a mobile device in which it is inserted, according to the card application toolkit framework specific of the wireless technology used. For instance, in a $3^{rd}$ Generation Partnership Project (3GPP) compliant mobile network, this applet could consist in a USIM (Universal Subscriber Identity Module) Application Toolkit (USAT) or in a SIM (Subscriber Identity Module) Application Toolkit (STK) applet. The identity module card 105, as described later in relation to FIG. 2, may host (U)SIM application providing authentication features, along with other applications or applets.

In the present system, the first electronic device 101, for instance a user device, such as a PC, a laptop or a tablet, may host a source application (not shown on FIG. 1) such as a software component displaying to its user actions to be executed on a target mobile device, i.e. the authentication module bearing mobile device 102. This application could be an application locally installed on a device, such as a native application or a browser plug-in, or it could also be a Web application remotely accessed through a Web browser.

This source application is operatively coupled to the mediation server 110, i.e. it has at least access to a network connection in order to exchange data with the mediation server 110 over an agreed protocol, such as Hypertext Transfer Protocol (HTTP). Such an application may allow to:

optionally highlight interesting data in a data page displayed on the first electronic device 101, identify one or more categories that can be associated to the selected data, determine from the identified categories one or more actions associated to the selected data, optionally display the different commands to the user for selection of one or more desired commands. The user of the first electronic device 101 can trigger the display of the commands by clicking or right-clicking on a selected data of the user interface.

Such identification of categories and determination of actions may use for instance Natural Language Processing (NLP) and the identification of specific formats of data (like an address, a phone number . . . ). These techniques are known today for software like Microsoft Word™ or the Apple iPhone™ OS that allows the identification of data (by highlighting the data) and offering a list of actions (save, transfer, copy, download, add to address book or contact list . . . ). Skype also offers the preselection of phone numbers in a webpage, and the possibility of triggering different actions such as making a call, saving to address book . . . .

When the source application consists in an application running on the first electronic device 101 (i.e. local to the source device 101), the user interactions, such as the choice of one or more commands, will trigger the submission of a request to the mediation server 110. Such a request will comprise the selected data and the chosen one or more commands.

In an alternative embodiment of the present system, the source application may reside on another server (not shown in FIG. 1). This would be the case, for instance, of a corporate directory Web server that allows employees to browse the directory from their PC and to trigger a call to an employee listed in the directory by clicking on its name, and choosing a call command. In this case, the source application implementing the request submission to the mediation server 110 is running on this directory server. However, the request to the mediation server is also triggered by the user when choosing for instance an action associated to the selected data.

In the present system, the mediation server may be a network entity in a telecommunication network (not represented on FIG. 1) that enables the present method. The present method may be offered through a "click to authentication module" service (referred to as "click to SIM" service here after) hosted on the mediation server 110, service that the user of the target mobile device 102 can subscribe to.

To enable the "click to SIM" service, the mediation server 110 may be configured to:

provide the source application referred here above to the first electronic device 101 for the specific embodiment wherein said first electronic device is hosting it, register the user's devices such as the target mobile device 102, along with the type of applet provided with its identity module card 105, as described here after, receive from the first electronic device 101 the selected data, and one or more commands, sent by the source application mentioned before, determine the target mobile device and its corresponding applet, that will interpret the triggering message, generate using the received data and command(s) a message targeted to the mobile device 102 and in a format understandable by its applet running on its authentication module 105, submit this message over a communication bearer, for instance either SMS or data.

In addition, in the exemplary illustration wherein the command involves the transfer of data physically stored on the source device 101 to the target mobile device 102, this server may comprise storage capabilities (like storage 115 in FIG. 1) to temporarily store such data submitted by the source application, in order to be subsequently retrieved by the target mobile device 102. This aspect will be described with more details here after along with other use cases.

It should be noticed that the mediation server 110, in order to encode the desired instructions in messages that could be securely delivered to the target applet, may require interfacing with external network entities whose functionalities are well known to those skilled in the art and that are beyond the scope of this invention. For instance, if SMS is selected as bearer, the mediation server may need to interface with an SMS Centre (SMSC) to submit those messages. In addition, if such messages are required to be encrypted, the mediation server may need to interact with an Over-the-air (OTA) platform which has knowledge of all the target card profiles and keying material to correctly encrypt SMS messages.

The target mobile device 102 corresponds to the mobile device in which is inserted the identity module card 105 hosting the target applet mentioned above. Upon determining from the indication that the triggering messages issued by the mediation server 110 are intended for the authentication module card, the mobile device 102 will pass on these messages to the authentication module card 105 after reception. The mobile device actually just acts as a forwarding entity that looks for the indication in the messages received by the mediation server and forwards them to the authentication module provided said mobile device finds this indication. The indication, as explained later on, may be added in the headers of the message generated by the mediation server.

This mobile device 102 can nevertheless be seen as the ultimate target of the commands and data originally issued by the source application. Indeed, once the applet interprets and executes the commands, it will request the target device 102 to carry out the commands in relation to the data (e.g. make a call, download a map, store a new contact . . . ). In order to successfully execute the commands issued by the card applet, this mobile device may support a shared toolkit interface (e.g. USAT or STK) with the card.

Figure 2:
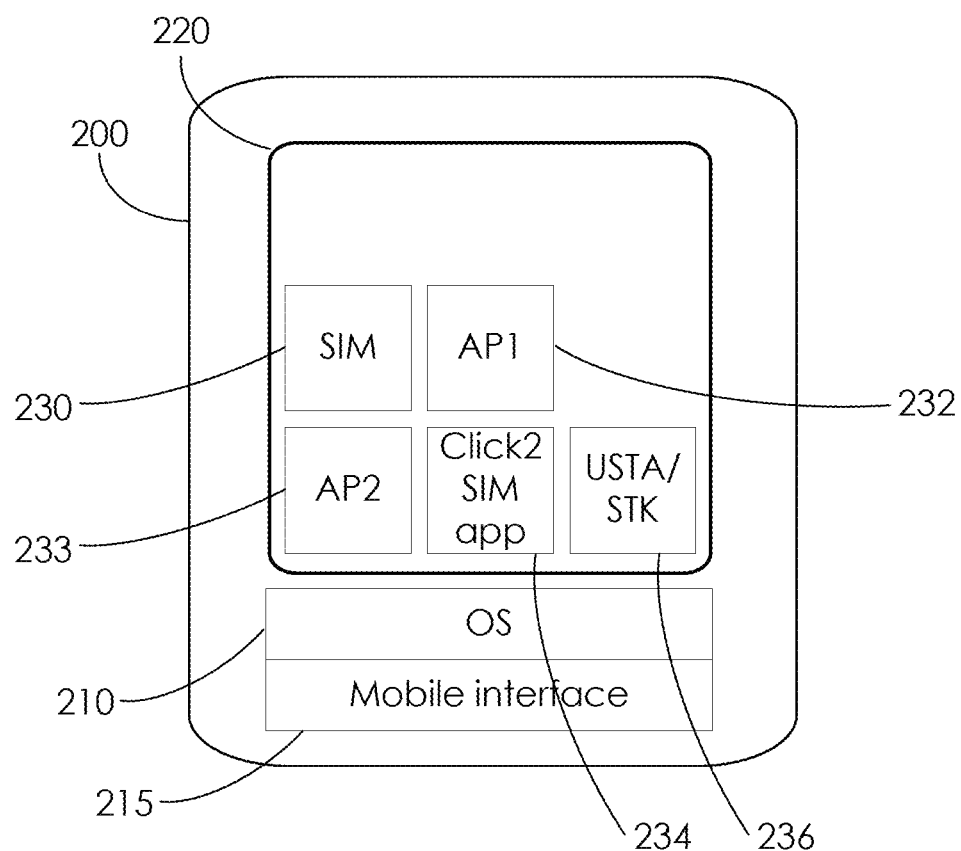
FIG. 2 shows an exemplary embodiment of an authentication module in the present system.

The identity module and different other applications, running on the device identity module, are illustrated in FIG. 2. The ICC of the target mobile device 102 is illustrated in the form of a SIM or USIM card 200 comprising an OS 210 and an application layer 220. A mobile interface 215 is provided to interface the different applications with the mobile device 102.

A number applications, or software, 230 to 236 are available and running in the application layer 220 of SIM card 200, including the SIM application itself 230. These applications may be provided by the network operator prior to the mobile device 102 first operations or may be uploaded from the network using for instance Remote Application Management (RAM) commands sent over SMS messages as defined in ETSI TS 102.225 Remote APDU structure for UICC based applications.

A card applet, such as the purpose specific "Click to SIM" applet 234 or a bytecode interpreter 236, may be provided to enable the interpretation of the messages sent by the mediation server 110. Both types of applets, enabling the present "Click to SIM service", are presented in FIG. 2 for illustration purposes. One of them may only be needed for a given type of authentication module. More specifically, the role of the card applet is to:

receive messages generated by the mediation server using the command (s) and data sent from the source application. The communication bearer as mentioned before may be e.g. through SMS or a data connection as explained later, interpret and execute the instructions specified in the received messages. The interpretation and execution may comprise the submission of one or more proactive commands to the mobile device 102 in relation to the selected data. Optionally, the card applet 234 or 236 may report information on the status of execution of such commands to a remote network entity either using the same bearer over which the instructions have been received or using another bearer As explained above, the applet 243 or 236 is in charge of receiving messages from the meditation server and comprising commands for the selected data. It will further interpret the messages and execute the interpreted commands for the selected data. These functionalities can be implemented in a plurality of different ways. As a non-limiting example, the card applet could be an applet 234 implemented for this specific purpose, such as an STK or a USAT applet, receiving the messages over either an SMS message or over a data connection established between the applet and the mediation server. Such a purpose specific applet 234 may be downloaded to the SIM card over the air from the mediation server after registration of a user's device.

Alternatively, these functionalities could be provided by any card bytecode interpreter or micro-browser applet which supports the "push" of commands through messages received from a remote network entity. For instance, this applet could be a SIM Alliance (S@T) browser, capable of executing instructions encoded in S@T bytecode, contained in either low-priority or high-priority push commands sent to the applet by a S@T server application. Alternatively, this applet could be a USAT interpreter, capable of executing instructions encoded in USAT bytecode, contained in operational push commands sent to the applet by a USAT application provider.

In any event, as explained later, the choice of applet type will determine the way the mediation server 110 encodes the messages generated from the selected data and commands.

Figure 3:
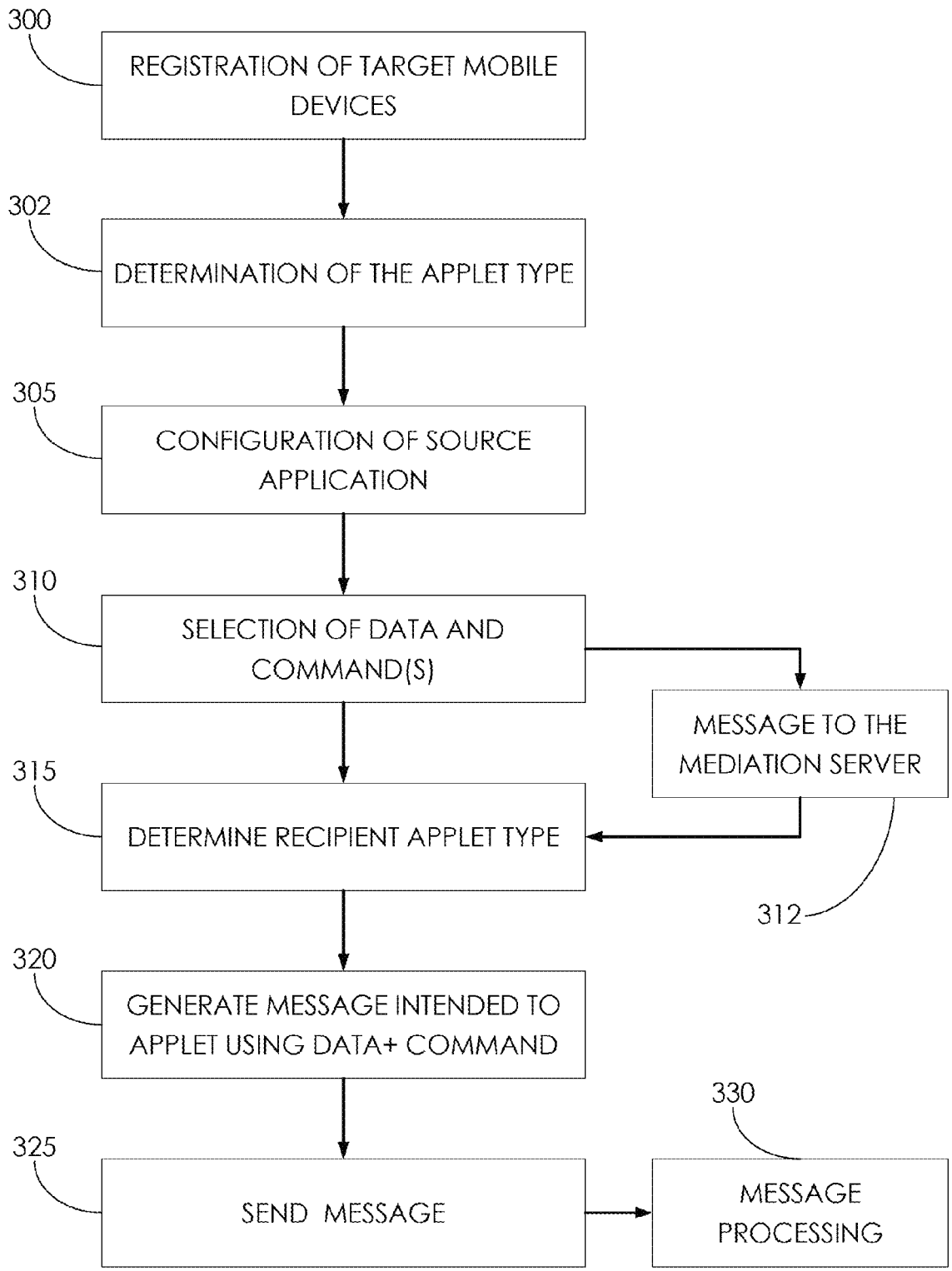
FIG. 3 shows an exemplary flowchart for transferring data and a command to an electronic device according to a first embodiment of the present method.

FIG. 3 is an illustration of an exemplary embodiment of the present method that is carried out by the mediation server 110. In a preliminary or initiation act 300, the user may register one or more authentication module bearer devices 102 with the mediation server 110. The registration may be carried out through a web portal offering the "Click to SIM" service to users. For instance, the user may provide parameters related to his mobile devices 102 such as phone number or its unique MSISDN (Mobile Station International Subscriber Directory Number). More generally any unique identifier in the telecommunication network that enables the mediation server 110 to send messages to the target mobile device 102 may be used for the registration.

For all the registered devices, in a further act 302, the mediation server 110 will determine the applet associated to the registered mobile device 102. The information may be collected directly from the operator's database provided it is available thereon. Alternatively, the mediation server 110 may sent a message, like an SMS, enquiring the type of applets available on the newly registered target device 102. For a registered device, the mediation server 110 will store in an applet lookup database 115 (shown in FIG. 1) the type of applets identified in act 302. This indexing applet type/target device will enable the mediation server 110 to know prior to generating the triggering message which applet will interpret that message.

In an additional embodiment of the present method, provided the authentication module of the registered mobile 102 answers with no available applet to enable the present "Click to SIM" service, the mediation server 110 may send an SMS over the air as mentioned before and comprising the purpose specific applet 234 mentioned before.

In a further act 305, the source application may be updated with an identifier for each registered target device. This identifier may be the same as the one used to index the applet type in the applet lookup table 115. This update allows the source application to send the data and command(s) to the mediation server in association with a registered target device(s) 102 so that the mediation server can identify the target device. Furthermore, when more than one target devices are registered, the user can select one specific mobile device among all the registered ones.

The identifier may be for instance the phone number itself or a cookie or token assigned by the mediation server 110. Alternatively, the mediation server 110 may assign an identifier different than the one stored in the applet lookup database, the target mobile device 102 will then be retrieved by the mediation server 110 using this assigned identifier and the lookup database.

In an additional embodiment of the present device, a user identifier may be provided with the configuration of the source application in act 305. This user identifier may be generated by the mediation server 110 upon registration of the user to the "Click to SIM" service for instance and passed on to the source application. It may be used to retrieve information about a user if the "Click to SIM" service is offered to him through different levels of subscription. Additionally, when only one target device has been registered by a user, his user identifier may be used in place of the target device identifier for the mediation server 110 to identify that target device.

In an additional embodiment, and prior to act 305, the source application may be downloaded to the source device provided the "Click to SIM" service is enabled using a source application local to the source device 101.

One may note that the registration of the target mobile devices, the determination of the applet type and the configuration of the source application may be carried out through one single operation for the user, for instance if the source application is also configured to register the different authentication module bearer devices from the user. This allows for instance an easy configuration of the source application as the provision of the phone numbers for instance using the source application will allow its immediate configuration without the need to have the mediation server 110 send an identifier of each registered target device.

In a further act 310, the user will select data and one or more commands associated to these selected data. This is enabled as mentioned before thanks to the source application. A user may for instance right click on a user interface showing various information like phone numbers, addresses, web links . . . . The right click will cause the source application to analyze the selected data and offer a number of commands that can be associated to the selected data, like store to contact list, display on phone, make a call, display in a map application . . . .

The command may correspond to the proactive commands as defined in ETSI TS 102 223: Smart cards: Card Application Toolkit (CAT) wherein proactive UICC (Universal Integrated Circuit Card) commands are disclosed. Examples of proactive commands will be listed here after.

In the present system, the target mobile device comprises, i.e. is associated to, an authentication module, itself supporting a number of predefined commands, or proactive commands. The commands/actions presented to the user through the source application will correspond to these proactive commands. In other words, the commands retrieved for the selected data are mapped onto the commands defined for, i.e. handled or supported by, the authentication module.

The source application may for instance retrieve the category the selected data pertains to, and list a number of these proactive commands that could handle such a data category.

As mentioned before, some data may be preselected for the user, like highlighted in a different color so as to signal to the user that such data can be of interest to him.

The user interactions, once he has made his mind about which data and which actions to send, will cause the source application to send in a further act 312 the selected data and the chosen one or more commands to the mediation server 110.

One may note that the command is illustrated as being received from the source application. In an alternative embodiment, the command may be retrieved by the mediation server from default settings, e.g. when the commands are specific to an application like the corporate directory Web server mentioned before. Indeed in this specific example, the commands may be a call or sending an email depending on which data is selected by the user.

In order to allow identification of the target mobile device(s) by the mediation server 110, the source application will insert in the information sent to the mediation server 110 an identifier for the target mobile device 102, as known from the configuration act 305 (target device identifier or user identifier).

Once the mediation server 110 has received the selected data, retrieved the identifier (user and/or target device) and command(s) from act 312, it will in a further act 315 determine the applet type available in the authentication module of the target device. To do so, the mediation server will retrieve from the applet lookup database 115 the applet type indexed with the identifier.

In a subsequent act 320, the mediation server 110 will generate from the selected data and command(s) a triggering message, its format being based on the applet type. It will insert in this new message an indication that it is intended to the identity module card 105 of the target mobile device 102. That indication is essential to the recipient mobile device 102 to determine the recipient of a received message.

The generation of the new message, as well as the choice of the indication, are dependant upon the applet that will process, i.e. interpret, the message, and choice of communication bearer. The mediation server thus converts the messages generated by the source application into messages supported, i.e. understandable, by the authentication module of the target device. For instance, the selected data and commands may be encoded in S@T bytecode on top of some 3GPP-defined headers so as to be understood by the target applet SIM Alliance (S@T) browser using the example mentioned here before. As the mediation server knows the "language" of both the source application and the target SIM, it can easily translate commands generated by the source application in commands understandable by the target authentication module. The examples here after will illustrate the different mapping handled by the authentication server.

Case of a SMS Type of Message:

In the case of the SMS message, the target mobile device may be identified and targeted using its MSISDN. As mentioned before, the applet available on the identity module card 105 of the target mobile device 102 may be a purpose-specific card applet which communicates with the mediation server over a shared protocol. Such a card applet could be downloaded from the mediation server 110 after registration of a mobile device 102. With the example of a communication bearer using SMS, the commands and selected data could be submitted from the mobile device 110 to the applet, for example, inside one or more class 2 SMS messages.

An SMS class is defined in 3GPP TS 23.038 Technical Specification Group Core Network and Terminals; Alphabets and language-specific information (Release 9). (U)SIM Data download is a facility whereby the target mobile device must pass the short message in its entirety including all SMS elements contained in the SMS and deliver these elements to the (U)SIM. In order to allow such a download mechanism, the SMS message must be a class 2 message. This is set using the parameter TP-DCS (TP-Data-Coding-Scheme) as explained in 3GPP TS 23.040 Technical Specification Group Core Network and Terminals; Technical realization of the Short Message Service (SMS) (Release 9).

Figure 4A:
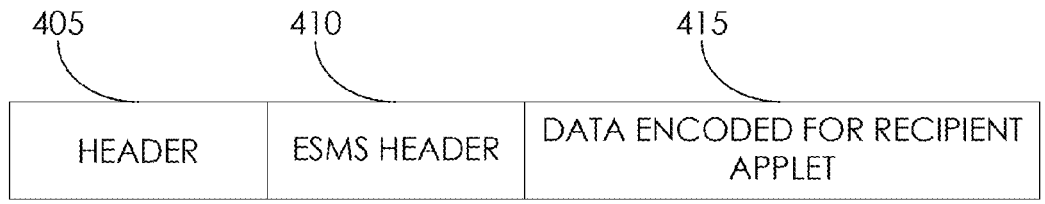
FIG. 4 shows an exemplary message according to another embodiment of the present method.

FIG. 4A is an exemplary embodiment of an SMS structure. The TP-DCS can be found in the SMS header 405 which is processed by the target mobile device 102.

As several applets can be found in the authentication module of the target mobile device 102 (see illustration of FIG. 2), each applet can be referenced by a pointer. The indication may be further specified by the mediation server 110 by adding this pointer in the triggering message so that the identity module card 105 can determine which applet will process the triggering message.

In the specific case of SMS messages used as a bearer, the enhanced SMS messages, as specified by 3GPP TS 23.048 Technical Specification Group Core Network and Terminals; Security mechanisms for the (U)SIM application toolkit, defines the Target Application Reference (TAR) as the pointer which allows to assign to a given target card applet a class 2

SMS. The enhanced SMS header 410 is presented in FIG. 4A and comprises the TAR parameter that is processed by the identity module 105 itself.

The TAR can be determined by the mediation server 110 upon discovery of the applet type as illustrated in FIG. 3 in reference with act 302. The TAR can then be saved in the applet lookup table 115, and indexed with each target mobile device entry.

Consequently, in this specific embodiment using a SMS triggering message, the indication that the new message is intended to the target device identity module 105 is the class TP-DCS, while the TAR, the pointer to the purpose specific applet, will allow the determination of the target applet.

The command(s) along with the selected data may be encoded in the body 415 of the SMS, as seen in FIG. 4A.

Alternatively to the use of purpose specific or dedicated card applet (Click to SIM applet 324), a bytecode interpreter 326 could be used. Many cards already available in the market have a bytecode interpreter preinstalled. A bytecode interpreter is simply a card applet, such as a USAT or an STK applet, capable of executing commands called proactive and encoded in the format of a bytecode that could be either:

Physically located on the card 105,
Pulled from an application server at runtime,
Pushed from an application server at runtime.
Examples of bytecode interpreters include:
USAT Interpreter specified by 3GPP TS 31.112, 31.113 and 31.114, which is capable of executing USAT bytecode.
S@T Browser, specified by the SIM Alliance, which is capable of executing S@T bytecode.

Both bytecode interpreters mentioned above are capable of executing bytecode remotely pushed from a server (like the mediation server 110) encapsulated in an Enhanced SMS (ESMS) message encoded according to 3GPP TS 23.040 and TS 23.048. If the encoding for a bytecode interpreter applet may be different than the encoding for the purpose specific applet, the indication in the triggering message will use rely upon the TP-DCS and TAR parameters described before.

In order to enable the use of the bytecode interpreter, the mediation server may need to interact with external entities that can receive data and commands, appropriately encode them and securely send it to the bytecode interpreter of the target mobile device for execution. The details on how to push bytecode to a bytecode interpreter from a server is specified by the respective specification documents listed above.

Figure 4B:
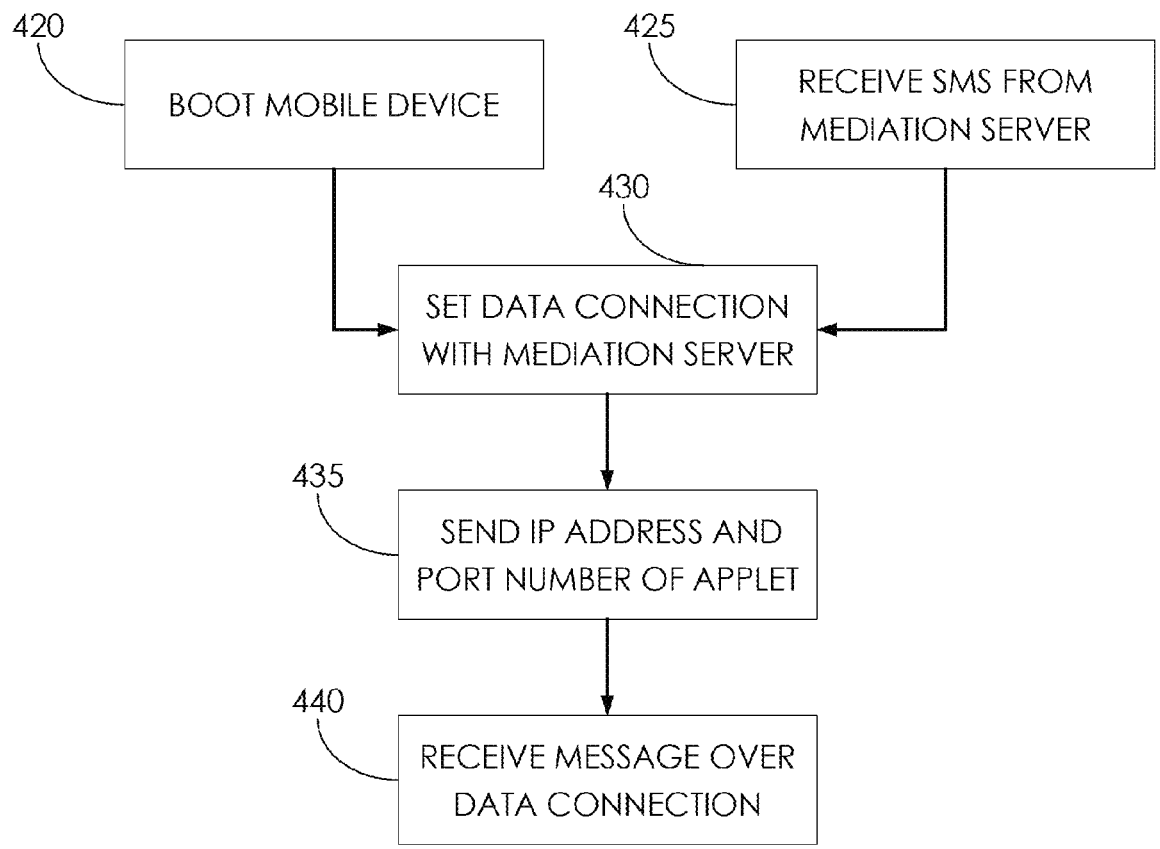

Case of a Data Bearer:

In an alternative embodiment of the present method, instead of using a SMS bearer, a data connection could be used to transfer the triggering message from the mediation server 110 to the target applet, provided the target mobile device 102 supports it. FIG. 4B provides an exemplary flowchart of this alternative embodiment.

In this embodiment, the data connection could either be a persistent connection initiated by the card, for instance, at bootstrap (act 420) or a short-lived connection initiated by the card upon a specific triggering event, such as a specific SMS message received from the mediation server (alternative act 425).

Whether the target card applet triggers itself the data connection or upon receipt of a specific SMS message from the mediation server 110, the target card applet knows the IP address of the mediation server 110 through for instance the download the purpose specific card applet, or a specific SMS informing the target card applet of the mediation server address.

Whenever a data connection is set with the mediation server, the target mobile device is sharing a single IP address for all its different entities, including the different applets running on its identity module card 105. Card applets are then distinguished using a port number.

When initiating the data connection (act 430), the target mobile device 102 will inform the mediation server 110 of its IP (internet protocol) address, as well as the target applet port number. The IP address and port number (sent through act 435) may be then saved by the mediation server 110 in the applet lookup table 115 indexed with each target mobile device entry.

When the mediation server 110 sends a data message (instead of an SMS message as illustrated before) in a further act 440, the message will comprise the IP address and port number for the recipient target applet enabling the present "Click to SIM" service. The port number can be seen as the indication to the target mobile device that the triggering message is intended to it identity module 105, and more specifically the target applet. Indeed the target mobile device 102 may not be aware that the specific port corresponds to the target applet hosted by its identity module 105. Nevertheless, the initiation from act 430 informs the mediation server 110 on how to reach the identity module and more specifically the target applet.

Going back to FIG. 3, whenever the triggering message has been generated by the mediation server 110, from the selected data and the command(s), it will be sent over the relevant communication bearer as explained with the illustration of a SMS or data bearer, in a further act 325.

One may note that the relevant communication bearer may be set by the service itself, at registration of the device, and optionally defined by the user as an option to the "Click to SIM" service.

The mobile device, upon reception of such messages, determines that the indication (TP-DCS or port) in the received message that it is intended to a specific element, i.e. its identity module 105 and can subsequently notify it to the card. In the case of a SMS message, it may be through the issuance of SM-PP DOWNLOAD ENVELOPE message, containing the body of the received message. If the target applet is registered with the Toolkit Registry to receive such events, they will be notified by the call of its process Toolkit method.

One may note that the present embodiments were described with the use of a physical ICC card as the identity module of the target mobile device. The present teachings are equally available for the new generation of soft identity module which are available in most recent mobile devices. Such soft SIM cards software implementation of physical hardware and can be addressed by the mediation server as a regular identity module card. Consequently the mediation server 110 encode the new message generated from the command(s) and selected data in the same way.

Use Cases

Figure 5A:
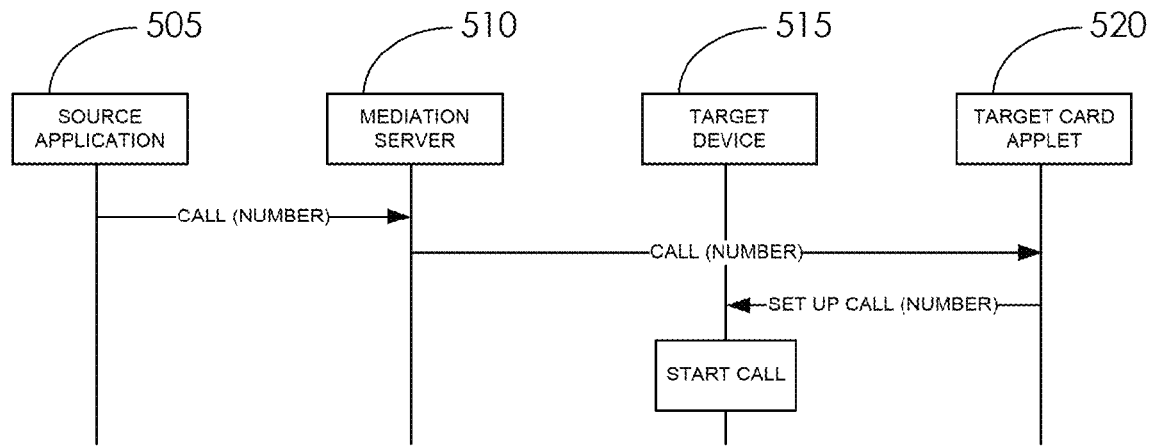
FIGS. 5A-5D show exemplary flowcharts according to various embodiment of the present method.
Figure 5B:
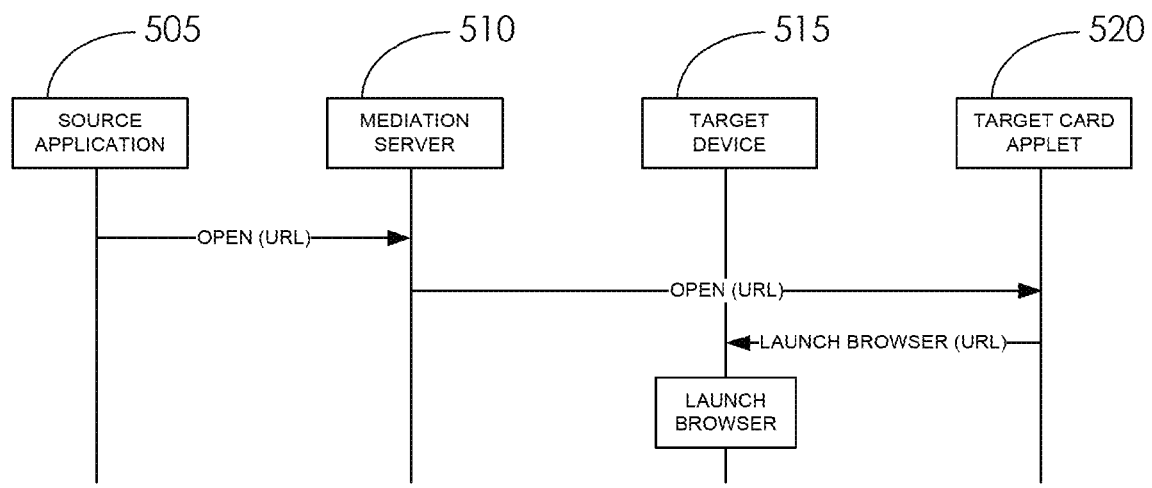

In this section a number of use cases enabled by the present system and method are described. As illustrated here after in relation to FIGS. 5A-5D, the user may for example right click once the data has been selected, and a list of action is inferred by the source application, Triggering Mobile Originated Calls This use case illustrated in FIG. 5A consists in a source application 505 issuing a command that triggers the target mobile device to initiate a phone call toward a specified phone number. An example of this use case could be represented by a Web runtime application (e.g. a Javascript application) embedded in a corporate directory Web application that automatically highlights phone numbers when displayed on a first electronic device 101, like a desktop computer. Such a source application 505 allows a user to initiate a mobile call by clicking on the specified phone number.

This use case may be executed as follows.

(i) Upon an automatic or user-generated event (such as clicking on a phone number as in the example above), the source application 505 sends a request to the mediation server 510 including at least the phone number to be called (the selected data) or alternatively, if the phone number is accessible by the mediation server 510, a reference to the network location of that phone number, e.g. a Uniform Resource Locator (URL) pointing to a resource including that phone number. One may note that the command "call" may be implicit here as the Web application is configured to make calls. The mediation server 510 will use retrieve a default command corresponding to the "call" command.

(ii) The mediation server 510, upon reception of the request, verifies its syntactic validity and determines the target mobile device 515 and corresponding applet 520 to which the command is addressed. Different methods could be used by the mediation server to determine the destination of the command, as described in relation to the configuration act 305 in FIG. 3. For instance, it could be explicitly declared by the source application in the request message or can be derived by the mediation server 510 from some authentication information appended to the message, such as an HTTP cookie or an authorization token, using the applet lookup database 115. Nevertheless, all these possible methods are well known to those skilled in the art and are beyond the scope of the present method and system. The mediation server 510 also determines the type of target card applet, also using database 115, (iii) At this stage, the mediation server 510 generates the triggering message using the "call" command, the number to call, and an indication that the triggering message is intended to the identity module card (not shown in FIG. 5A) of the target mobile device 515. Depending on the type of target card applet available on the target mobile device (known from the applet lookup table 115), the indication will further be/comprise an indication that the triggering message is indeed intended for that applet 520, (iv) The mediation server 510 then submits the triggering message to the target mobile device 515. The device 515 will read the indication (e.g. TP-DCS or port) and pass it on to the identity module. The message will then be processed by the target applet 520 (as indicated by the TAR or port). After interpreting the triggering message and retrieving the "call" command, the target applet 520 issues a SET UP CALL proactive command to the mobile device, containing, as value of the "Address" TLV object, the phone number provided by the source application, encoded as specified by ETSI TS 102.223. The command could also include instructions to issue additional proactive commands. For instance, the command may instruct the applet to issue a GET INPUT command first, giving the possibility to the user to edit the phone number that will be later called.

Pushing Web Resources to the Mobile Browser

This use case consists in a source application 505 issuing a command that triggers the target mobile device to launch the Web browser to open a specified URL. An example of this use case illustrated in FIG. 5B consists in a Web browser plug-in that allows to right-click on a Web link (the selected data) and open it on the mobile browser, so that it can be added to a target mobile phone bookmarks. It should be noticed that this use case is not only limited to triggering the opening of web pages on a mobile phone, but it can be used to open any kind of Web resources accessible from the Internet though a URL, such as images, videos, application installers and so on.

This use case is executed as follows.

(i) Upon an automatic or user-generated event (such as right-clicking on a web link as in the example above), the source application 505 sends a request to the mediation server 510 including at least the Uniform Resource Locator (URL) pointing to a resource that it is desired to be accessed from the target mobile device 515. The command may be for instance an "open the Web link" command or an "add to bookmark" command. As mentioned before, the command (s) may be selected by the user from the list of commands popping up on the first electronic device interface, (ii) The mediation server, upon reception of the request, verifies its syntactic validity and determines the target mobile device 515 to which the command is addressed, as explained above. As in the previous (ii) act of FIG. 5A, the target card applet type is also retrieved from the applet lookup table 115, (iii) At this stage, the mediation server generates a triggering message with the indication (TP-DCS or port for instance) that it is intended to the identity module of the mobile device 515. More specifically depending on the card applet, the indication will further be an indication (e.g. TAR or port) that the triggering message is indeed intended for the target applet 520, The triggering message will be generated using the command (open the Web link or add to bookmark) and the URL, (iv) The mediation server then submits the triggering message to the target mobile device (not shown in FIG. 5B) and more specifically its card applet 520. After interpreting the triggering message and retrieving the command (say e.g. an open the Web link command), the target applet 520 issues a LAUNCH BROWSER proactive command, containing, as value of the "URL" TLV object, the URL provided by the source application, appropriately encoded. The command could also include instructions to execute additional tasks. For instance, the command may instruct the applet verify if the mobile device is currently roaming to a Visited Public Land Mobile Network (VPLMN) and ask user confirmation before launching the browser.

(v) At the reception of the proactive command, the mobile OS launches the default mobile browser. The mobile browser, after being launched, issues an HTTP GET request to download the resource originally specified by source application.

Transfer of Files Between Devices

Figure 5C:
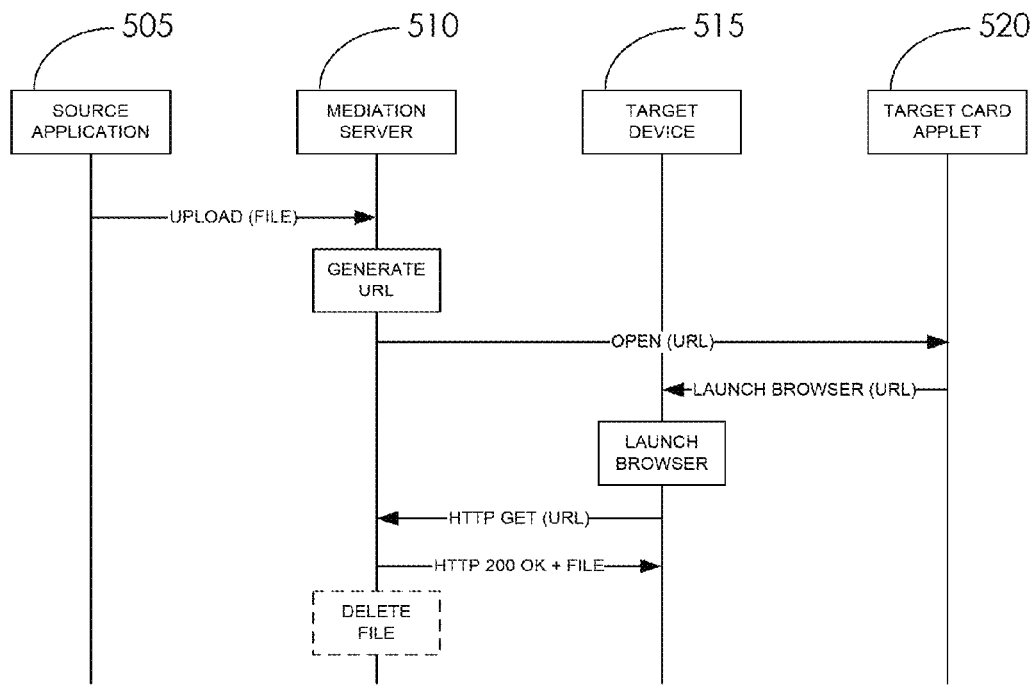

This use case is illustrated in FIG. 5C and consists in a source application pushing a data file locally stored on the first electronic device or source device on which is running to the source application 505. In the use cases illustrated before, in relation to FIGS. 5A and 5B, the selected data is pushed to the target mobile device and the target card applet 520. Such embodiments may not be convenient in case of a large volume of data. This third use case illustrates an alternative embodiment of the present method, wherein the large transfer is allowed.

This use case is executed as follows.

(i) Upon an automatic or user-generated event, the source application 505 uploads to the mediation server 510 the data file identified by the user as destined to the target mobile device, for example through an HTTP POST method call. This may for instance be available to the user upon right clicking on a given file to be transferred, and a command such as "transfer file to XX mobile device" among other known commands available from such known OS as Windows Vista™ or Windows 7™, (ii) The mediation server 510, upon reception of the given data file (the selected data), stores it and generate an URL pointing to this file. This URL may only be accessible to the target device for security reasons, so it may be interesting to make the URL ephemeral and hard to guess from potential hackers. For instance it could be generated to include a very long random string, (iii) After having generated the temporary URL for the file, the mediation server 510 generates a triggering message with the indication that it is intended to the identity module of the mobile device 515. More specifically depending on the card applet, the indication will further be an indication that the triggering message is indeed intended for that applet 520 hosted by the identity module. The generation of the triggering message, though not inserting the full data file in the message, is nonetheless using the selected data as actually it is a URL to that data file which is added to the triggering message, along with an "open a Web link" command, (iv) The mediation server 510 then submits the triggering message to the target mobile device 515 and more specifically its identity module card (not shown in FIG. 5C). The message will then be processed by the target applet 520 (as indicated by the TAR or port). That card applet 520 then interprets the triggering message and retrieves the command and URL. This command, similarly to the use case of opening Web links, instructs the card applet to issue a LAUNCH BROWSER proactive command to the mobile device. In this case, the value of the "URL" TLV object is the URL generated by the mediation server 510 pointing to the data file uploaded by the source application 505, (v) As a result of this proactive command, the mobile OS launches the default mobile browser. The mobile browser, after being launched, issues an HTTP GET request to download from the mediation server 510 the file uploaded by the source application. If the format of the file is supported by the browser, the browser opens the file. In the negative, it may prompt the user with a message asking where to download the file or automatically downloads it to a predefined location.

(vi) Upon successful download of said file from the mobile device, the mediation server may immediately delete the file to prevent it from being downloaded by unauthorized users. Alternatively, it could be deleted after a short period or persistently stored.

Transfer of Contact Information

Figure 5D:
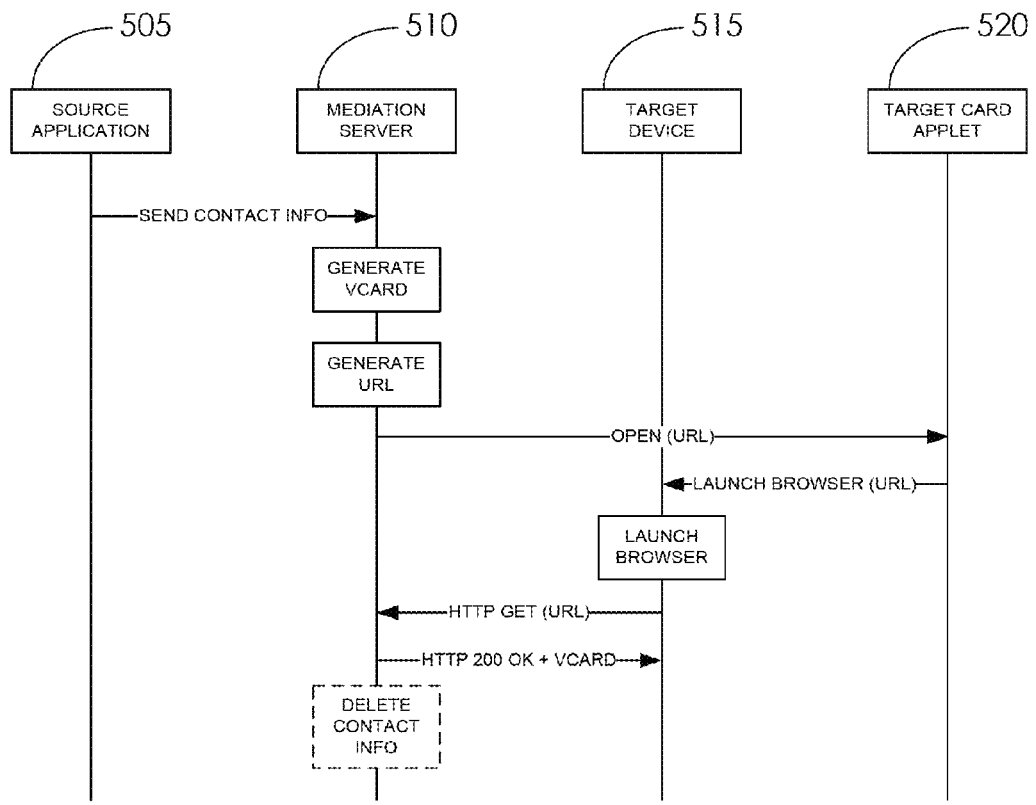

This fourth use case, illustrated in FIG. 5D, consists in a source application 505 sending contact information (such as a vCard) to the target mobile device. An example of this use case consists in a mail reader plug-in application allowing a user to send contact information from its mail reader address book to its mobile device.

This use case is executed as follows.

(i) Upon an automatic or user-generated event, the source application 505 uploads the contact information to the mediation server 510. This contact information could be expressed in the format of a vCard or of any other data structure suitable to represent contact details which is reciprocally understood by the source application and the mediation server. The command provided by the user may be a "transfer the vCard" command, or "save to the contact book" command. Alternatively, that same command may be implicit to the mail reader plug-in application. In this case, the mediation server may retrieve the command from a default command setting, instead of receiving it from the source application 505, (ii) The mediation server, upon reception of the selected data (the contact information), extracts the contact information and generates a vCard data structure including all the details uploaded by the source application and generate an ephemeral URL pointing to such vCard, (iii) After having generated the temporarily URL for the vCard, the mediation server generates a triggering message to be sent to the target mobile device and more specifically the target applet. The triggering message is generated from the selected data and the initial command selected by the user. Indeed the triggering message will comprise an URL point to the vCard and an "open a Web link" command. In this specific exemplary embodiment, the media server is configured to replace the "save to the contact list command" with the "open a Web link" command as the download of the vCard will itself cause the saving as seen here after, (iv) The mediation server 510 then submits the triggering message to the target mobile device 515 and more specifically its identity module (not shown in FIG. 5D). The message will then be processed by the target applet 520. That card applet then interprets the triggering message and retrieves the command and URL. This command, similarly to the use case of opening Web links, instructs the card applet to issue a proactive LAUNCH BROWSER proactive command to the mobile device. In this case, however, the value of the "URL" TLV object is the URL generated by the mediation server pointing to the said vCard.

(v) As a result of this proactive command, the mobile OS launches the default mobile browser. The mobile browser, after being launched, issues an HTTP GET request to download the vCard. Upon reception of the HTTP GET request, the browser replies with a 200 OK response appending the vCard and the header "Content-Type", with, as a value, an Internet media type identifying a vCard, such as "text/x-vcard", "text/directory;profile=vCard" or "text/directory".

(vi) The mobile browser is then able to identify the presence of a vCard in the HTTP response and may prompt the user to perform relevant actions, such as saving the contact to the mobile address book.

(vii) Similarly to the case above, upon successful download of the vCard from the mobile device, the mediation server may immediately delete the vCard to prevent being downloaded by unauthorized users. Alternatively, it could delete it after a short period or persistently store it.

The reference to the use of a vCard to deliver the contact information to the mobile device has been mentioned as an example only. Those skilled in the art would recognize that other formats could be used instead.

Thanks to the present system and method, as identity modules are available for most mobile devices, a user will not need to reinstall the target applet enabling the "Click to SIM" service. All he will need to do is simply insert his SIM in another mobile device to enjoy the same service he enjoyed with his previous device.

Figure 6:
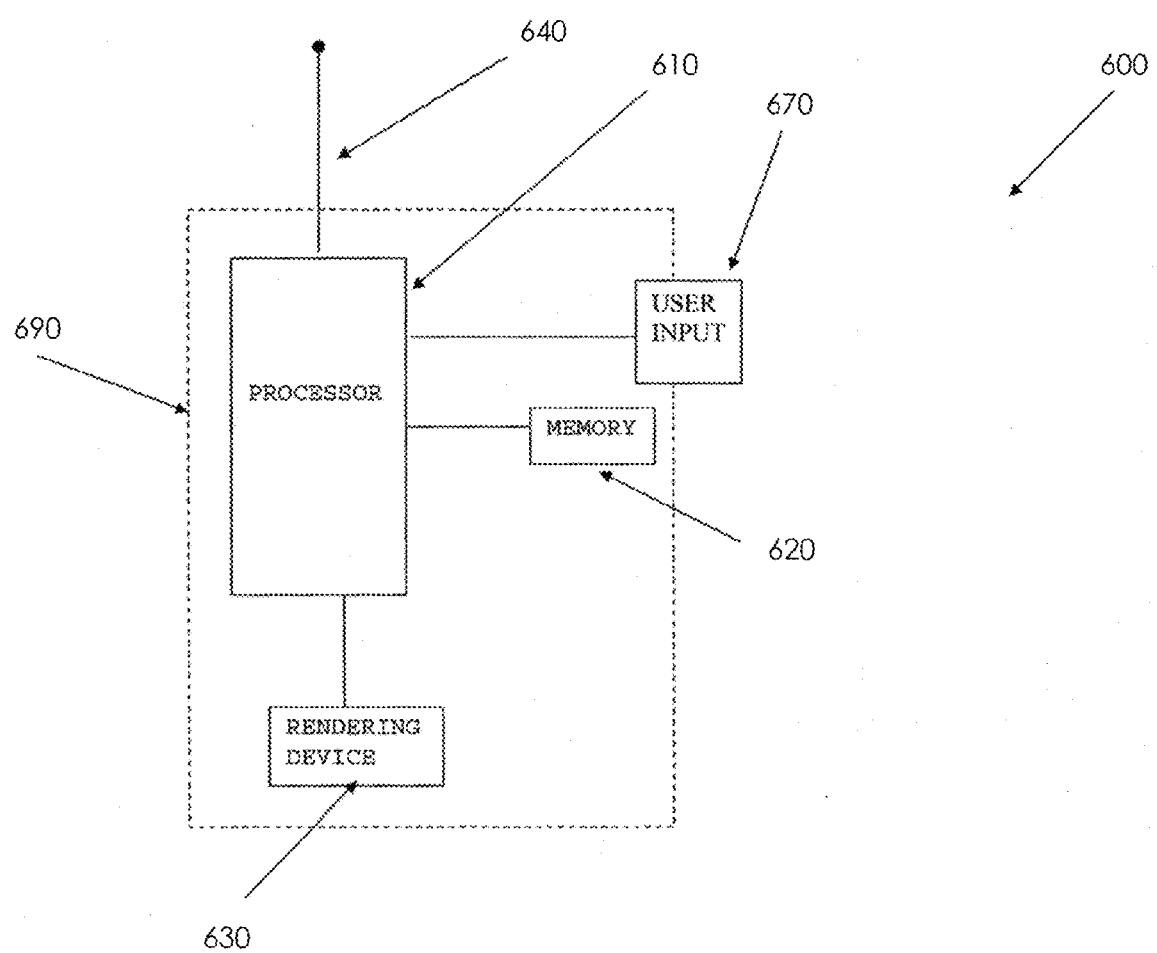
FIG. 6 shows another exemplary embodiment of the present system.

FIG. 6 shows a system 600 in accordance with an embodiment of the present system. The system 600 includes a mediation server 690 of a telecommunication network, and hosting a "Click to SIM" service according to the present system. Mediation server 690 has a processor 610 operationally coupled to a memory 620, a rendering device 630, such as one or more of a display, speaker, etc., a user input device 670, such as a sensor panel, a keyboard, trackball and the likes, and a connection 640 operationally coupled to other entities and nodes of a telecommunication network. The connection 640 may be an operable connection between the mediation server 690 and another node, server or device that has similar elements as mediation server 690, such as the first electronic device or source device hosting for instance the source application, or the second electronic device or target mobile device hosting the authentication module and its target card applet.

The memory 620 may be any type of device for storing for instance the application data related to the operating system of the mediation server 690, as well as to application data in accordance with the present method. The application data are received by the processor 610 for configuring the processor 610 to perform operation acts in accordance with the present system. The operation acts include:

identifying the first and second application platforms respectively from the first and second electronic devices, receiving first metadata describing the one or more first applications installed on the first electronic device, retrieving from the application database one or more second applications from the second application platform that are linked with the one or more first applications, using the received first metadata, providing to either one of the first and second electronic devices a list of applications from the second application platform, said list comprising the one or more retrieved second applications.

The user input 670 may include a sensor panel as well as a keyboard, mouse, trackball, touchpad or other devices, which may be stand alone or be a part of a system, such as part of a personal computer (e.g., desktop computer, laptop computer, etc.) personal digital assistant, mobile phone, converged device, or other rendering device for communicating with the processor 610 via any type of coupling, such as a wired or wireless coupling. The user input device 670 is operable for interacting with the processor 610 including interaction within a paradigm of a GUI and/or other elements of the present system, such as to enable entry of data by an operator.

Clearly the mediation server 690, the processor 610, memory 620, rendering device 630 and/or user input device 670 may all or partly be portions of a computer system or other device, and/or be embedded in one or more servers. The system, device and method described herein address problems in prior art systems. In accordance with an embodiment of the present system, the mediation server may send to the second electronic device a triggering message with an indication that it is intended to its authentication module.

The methods of the present system are particularly suited to be carried out by a computer software program, such program containing modules corresponding to one or more of the individual steps or acts described and/or envisioned by the present system. Such program may of course be embodied in a computer-readable medium, such as an integrated chip, a peripheral device or memory, such as the memory 620 or other memory coupled to the processor 610.

The computer-readable medium and/or memory 620 may be any recordable medium (e.g., RAM, ROM, removable memory, CD-ROM, hard drives, DVD, floppy disks or memory cards) or may be a transmission medium utilizing one or more of radio frequency (RF) coupling, Bluetooth coupling, infrared coupling, etc. Any medium known or developed that can store and/or transmit information suitable for use with a computer system may be used as the computer-readable medium and/or memory 620.

Additional memories may also be used. These memories configure processor 610 to implement the methods, operational acts, and functions disclosed herein. The operation acts may include controlling the rendering device 630 to render elements in a form of a GUI and/or controlling the rendering device 630 to render other information in accordance with the present system.

Moreover, the term "memory" should be construed broadly enough to encompass any information able to be read from or written to an address in the addressable space accessed by a processor. With this definition, information on a network is still within memory 620, for instance, because the processor 610 may retrieve the information from the network for operation in accordance with the present system. For example, a portion of the memory like the applet lookup database 115 understood herein may reside on different nodes of the telecommunication network.

The processor 610 is capable of performing operations in response to incoming user actions, and executing instructions stored in the memory 620. The processor 610 may be an application-specific or general-use integrated circuit(s). Further, the processor 610 may be a dedicated processor for performing in accordance with the present system or may be a general-purpose processor wherein only one of many functions operates for performing in accordance with the present system. The processor 610 may operate utilizing a program portion, multiple program segments, or may be a hardware device utilizing a dedicated or multi-purpose integrated circuit.

Finally, the above discussion is intended to be merely illustrative of the present system and should not be construed as limiting the appended claims to any particular embodiment or group of embodiments. Thus, while the present system has been described with reference to exemplary embodiments of a desktop computer as the first electronic device, it should also be appreciated that numerous modifications and alternative embodiments may be devised by those having ordinary skill in the art without departing from the broader and intended spirit and scope of the present system as set forth in the claims that follow.

Indeed the present teaching may be transposable to any electronic device capable of displaying a GUI (graphical user interface), with selectable data, such as a general purpose computer, a PDA, a pad . . . . Additionally, the present teachings were mostly illustrated with one command used to generate the triggering message. The present method could be readily applied to more commands applicable to the same selected data.

Further, while exemplary user interfaces are provided to facilitate an understanding of the present system, other user interfaces may be provided and/or elements of one user interface may be combined with another of the user interfaces in accordance with further embodiments of the present system.

The section headings included herein are intended to facilitate a review but are not intended to limit the scope of the present system. Accordingly, the specifications and drawings are to be regarded in an illustrative manner and are not intended to limit the scope of the appended claims.

In interpreting the appended claims, it should be understood that:

a) the words "comprising" or "including" do not exclude the presence of other elements or acts than those listed in a given claim;

b) the word "a" or an preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analogue and digital portions;

g) any of the disclosed devices or portions thereof may be combined together or separated into further portions unless specifically stated otherwise;

h) no specific sequence of acts or steps is intended to be required unless specifically indicated; and i) the term "plurality of" an element includes two or more of the claimed element, and does not imply any particular range of number of elements; that is, a plurality of elements may be as few as two elements, and may include an immeasurable number of elements.

The invention claimed is:

1. A method of selecting data from a first electronic device for a second electronic device, the second electronic device comprising an identity module card and being arranged to receive messages over a communication bearer, and transfer a received message to the identity module card when determining from an indication in said received message that the received message is intended for said identity module card, the method comprising acts of:

receiving from the second electronic device an applet type available on the identity module card;
retrieving data selected on the first electronic device;
retrieving one or more commands associated to said selected data, the one or more retrieved commands corresponding to predefined commands supported by the identity module card of the second electronic device;
generating, based on the applet type available on the identity module card and using the selected data and the associated command(s) a triggering message, said triggering message comprising an indication that the triggering message is intended for the identity module card of the second electronic device and enabling a triggering of the corresponding predefined command(s) for said selected data by said identity module card; and
sending the triggering message over the communication bearer to the second electronic device, thereby causing the identity module card to trigger the corresponding predefined command(s) for the selected data.

2. The method of claim 1, wherein the identity module card of the second electronic device comprises an applet configured for interpreting the triggering message, the indication in the triggering message further being an indication that the triggering message is intended for said applet.

3. The method of the previous claim 2, wherein the communication bearer is a SMS bearer, the triggering message being a SMS, and the indication comprising a class parameter to define the SMS as a data download SMS.

4. The method of the previous claim 2, wherein the communication bearer is a data bearer, the indication comprising a port number for the applet.

5. The method of claim 1, wherein the selected data is a data file, and the command a download command, the act of generating comprising:
storing the data file,
inserting in the new message a link to the stored file and the download command.

6. A mediation server for making data selected from a first electronic device available to a second electronic device, the second electronic device comprising an identity module card and being arranged to receive messages over a communication bearer, and transfer a received message to the identity module card when determining from an indication in said received message that the received message is intended for said identity module card, the mediation server being arranged to:

receive from the second electronic device an applet type available on the identity module card;
retrieve data selected on the first electronic device;
retrieve one or more commands associated to said selected data, the one or more retrieved commands corresponding to predefined commands supported by the identity module card of the second electronic device;
generate, based on the applet type available on the identity module card and using the selected data and the associated command(s) a triggering message, said triggering message comprising an indication that the triggering message is intended for the identity module card of the second electronic device and enabling triggering of the corresponding predefined command(s) for said selected data by said identity module card; and
send the triggering message over the communication bearer to the second electronic device, thereby causing the identity module card to trigger the corresponding predefined command(s) for the selected data.

7. A telecommunication system comprising:
a first electronic device available for selecting data;
a second electronic device comprising an identity module card and being arranged to receive messages over a communication bearer, and transfer a received message to the identity module card when determining from an indication in said received message that the received message is intended for said identity module card and
a mediation server being arranged to:
receive from the second electronic device an applet type available on the identity module card;
retrieve data selected on the first electronic device,
retrieve one or more commands associated to said selected data, the one or more retrieved commands corresponding to predefined commands supported by the identity module card of the second electronic device,
generate, based on the applet type available on the identity module card and using the selected data and associated command(s) a triggering message, said triggering message comprising an indication that the triggering message is intended for the identity module card of the second electronic device and enabling the triggering of the corresponding predefined command(s) for said selected data by said identity module card, and
send the triggering message over the communication bearer to the second electronic device, thereby causing the identity module card to trigger the corresponding predefined command(s) for the selected data.

8. A hardware computer readable medium including computer program instructions stored thereon that cause a computer to implement a method of selecting data from a first electronic device for a second electronic device when executed by the computer, the second electronic device comprising an identity module card and being arranged to receive messages over a communication bearer, and transfer a received message to the identity module card when determining from an indication in said received message that the received message is intended for said identity module card, wherein the method comprises:

receiving from the second electronic device an applet type available on the identity module card;
retrieving data selected on the first electronic device;
retrieving one or more commands associated to said selected data, the one or more retrieved commands corresponding to predefined commands supported by the identity module card of the second electronic device;
generating, based on the applet type available on the identity module card and using the selected data and associated command(s) a triggering message, said triggering message comprising an indication that the triggering message is intended for the identity module card of the second electronic device and enabling a triggering of the corresponding predefined command(s) for said selected data by said identity module card; and sending the triggering message over the communication bearer to the second electronic device, thereby causing the identity module card to trigger the corresponding predefined command(s) for the selected data.

* * * * *